(12) United States Patent
Wicks et al.

(10) Patent No.: US 10,272,925 B1
(45) Date of Patent: Apr. 30, 2019

(54) INTEGRATED PERFORMANCE BRAKING

(71) Applicant: Ford Global Technologies, LLC, Dearborn, MI (US)

(72) Inventors: John Wicks, Dearborn, MI (US); Evert Hendrik Aalt Kasteel, Lommel (BE); Todd Brown, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/797,557

(22) Filed: Oct. 30, 2017

(51) Int. Cl.

| | | |
|---|---|---|
| *B60T 13/74* | (2006.01) | |
| *B60W 50/08* | (2012.01) | |
| *B60W 10/184* | (2012.01) | |
| *B60W 10/02* | (2006.01) | |
| *B60T 7/10* | (2006.01) | |
| *B60T 7/08* | (2006.01) | |
| *B60W 30/182* | (2012.01) | |
| *F16D 65/10* | (2006.01) | |

(52) U.S. Cl.
CPC .......... *B60W 50/082* (2013.01); *B60T 7/085* (2013.01); *B60T 7/102* (2013.01); *B60W 10/02* (2013.01); *B60W 10/184* (2013.01); *B60W 30/182* (2013.01); *B60W 2710/021* (2013.01); *B60W 2710/18* (2013.01)

(58) Field of Classification Search
CPC ... B60T 13/74; B60T 7/10; B60T 7/02; B60T 7/08; F16D 65/18; F16D 121/04
USPC .......................................................... 701/70
See application file for complete search history.

(56) References Cited

U.S. PATENT DOCUMENTS

| | | | | |
|---|---|---|---|---|
| 5,753,873 A | * | 5/1998 | Blaudez | B60T 7/10 200/335 |
| 6,446,551 B1 | * | 9/2002 | Watanabe | B41N 1/245 101/119 |
| 7,127,342 B2 | * | 10/2006 | Nagura | B60K 17/3462 701/69 |
| 7,841,673 B2 | | 11/2010 | Szczerba et al. | |
| 8,494,745 B2 | | 7/2013 | Schneider et al. | |
| 9,242,624 B2 | | 1/2016 | Huennekens et al. | |
| 9,744,950 B1 | | 8/2017 | Lemmer et al. | |
| 2006/0197374 A1 | * | 9/2006 | Jez | B60T 7/085 303/20 |
| 2014/0249730 A1 | * | 9/2014 | Hilberer | B60T 7/122 701/70 |
| 2016/0137179 A1 | * | 5/2016 | Rudberg | B60T 8/1761 701/71 |

FOREIGN PATENT DOCUMENTS

| | | |
|---|---|---|
| CN | 106476778 | 3/2017 |
| DE | 102011112806 | 3/2013 |
| GB | 2494240 | 3/2013 |
| WO | 2017037080 | 3/2017 |

* cited by examiner

*Primary Examiner* — Tan Q Nguyen
(74) *Attorney, Agent, or Firm* — Ray Coppiellie; Hanley, Flight and Zimmerman, LLC

(57) ABSTRACT

Integrated performance braking is disclosed. A disclosed example apparatus includes a hand-operated lever of a vehicle, a data interface to operatively couple the lever to an anti-lock braking system (ABS) of the vehicle, and a brake controller to cause at least one wheel of the vehicle to lock via the ABS when the lever is rotated to a defined angular position.

17 Claims, 9 Drawing Sheets

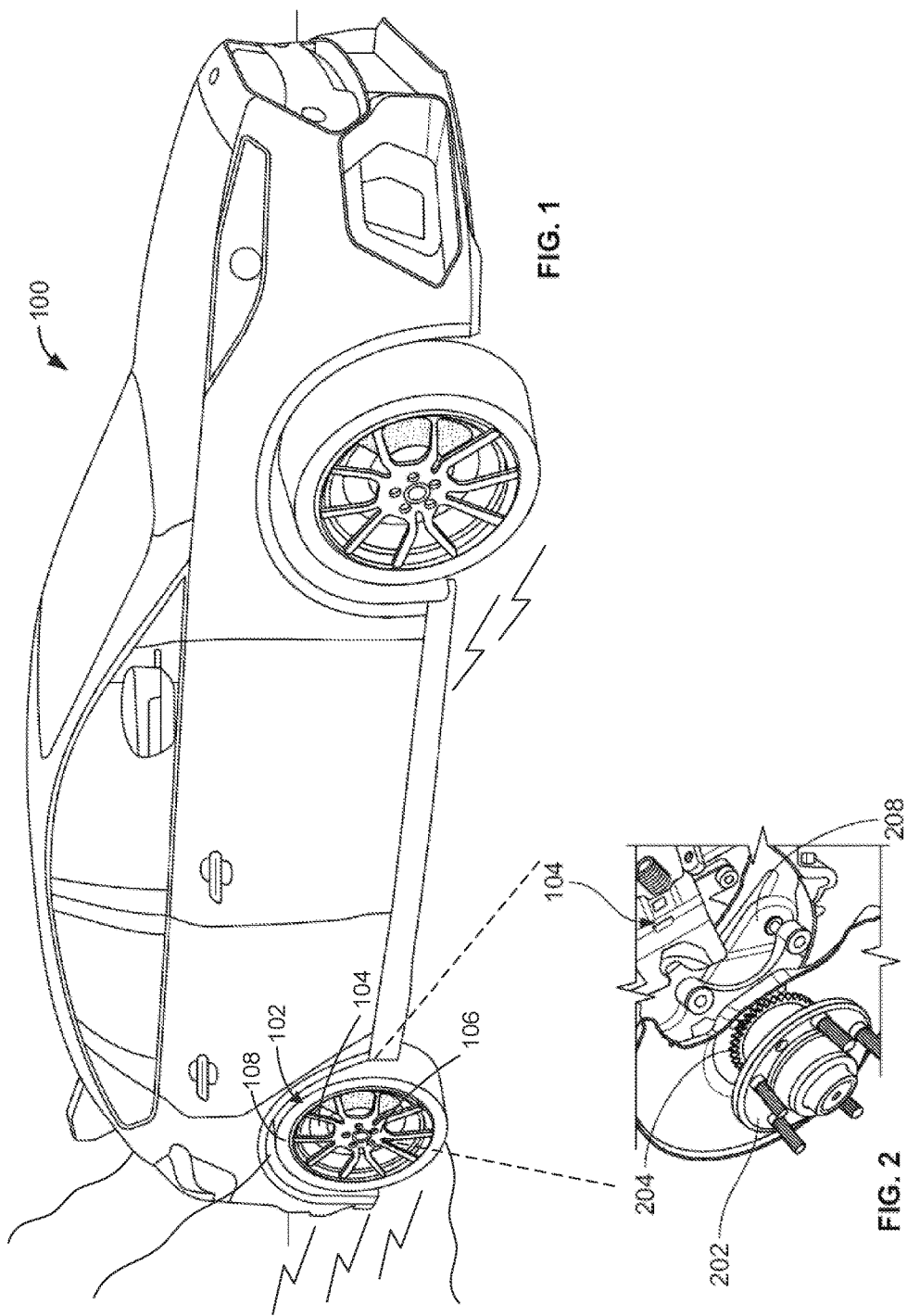

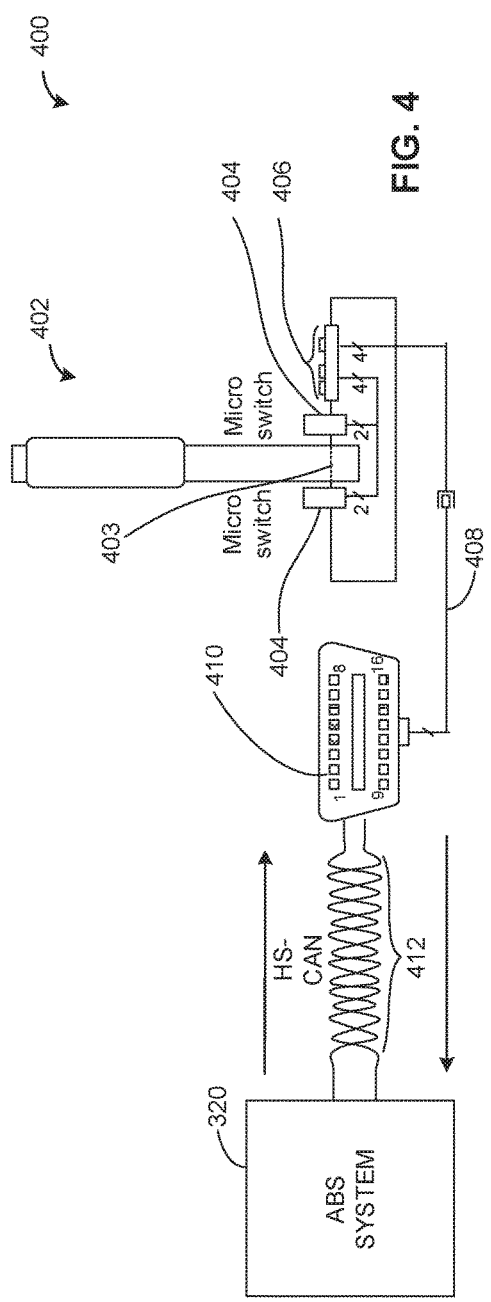
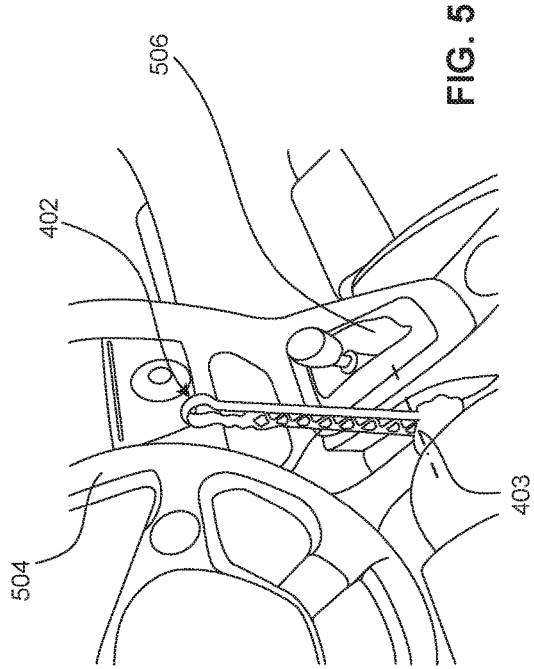

| ESC | LEVER PRESENCE | LEVER ROLLING COUNTER / CHECK SUM | ABS MODULE READY | VEHICLE SPEED | SERVICE BRAKE | LEVER SYSTEM ACTIVE |
|---|---|---|---|---|---|---|
| ESC OFF – 5 SECOND PUSH | INDICATED | CHECKS OUT | YES | 3-70 MPH | NOT IN USE | YES – LEVER SYSTEM ACTIVE |
| ESC OFF – 5 SECOND PUSH | NOT INDICATED | NOT INDICATED OR INCORRECT | YES | 3-70 MPH | NOT IN USE | NO |
| ESC OFF – 5 SECOND PUSH | INDICATED | NOT INDICATED OR INCORRECT | YES | 3-70 MPH | NOT IN USE | NO |
| ESC OFF – 5 SECOND PUSH | INDICATED | CHECKS OUT | YES | LESS THAN 3 MPH | NOT IN USE | NO |
| ESC OFF – 5 SECOND PUSH | INDICATED | CHECKS OUT | YES | MORE THAN 70 MPH | NOT IN USE | NO |
| ESC OFF – 5 SECOND PUSH | INDICATED | CHECKS OUT | NO | 3-70 MPH | NOT IN USE | NO |
| ESC OFF – 5 SECOND PUSH | INDICATED | CHECKS OUT | YES | 3-70 MPH | IN USE | NO |
| SPORT-DEFAULT | INDICATED | CHECKS OUT | YES | 3-70 MPH | NOT IN USE | NO |
| ESC ON – PUSH | INDICATED | CHECKS OUT | YES | 3-70 MPH | NOT IN USE | NO |

FIG. 7

INTEGRATED PERFORMANCE BRAKING

FIELD OF THE DISCLOSURE

This disclosure relates generally to vehicles and, more particularly, to integrated performance braking.

BACKGROUND

Performance braking systems are typically implemented for vehicles that are engaged in drifting (e.g., track drifting, closed course drifting) or rally racing. In particular, a manually-operated performance brake system can significantly prevent rotation (e.g., lock) of a wheel to cause a vehicle to drift. As a result, the vehicle can slide at least partially sideways while navigating a turn, for example.

To implement a performance brake system on a vehicle for drifting maneuvers or other precise driving maneuvers, numerous associated hydraulic brake components can be added. In particular, implementation of the performance brake system can involve addition of a master brake cylinder, lines, calipers, as well as openings in a vehicle cabin for integration. This integration of such components can involve significant cost, labor and complexity. Further, known performance brake systems are usually operated independent of other vehicle systems.

SUMMARY

An example apparatus includes a hand-operated lever of a vehicle, a data interface to operatively couple the lever to an anti-lock braking system (ABS) of the vehicle, and a brake controller to cause at least one wheel of the vehicle to lock via the ABS when the lever is rotated to a defined angular position.

An example method includes detecting, via a sensor, a rotation of a hand-operated lever of a vehicle, transmitting a signal associated with the detected rotation of the lever to a data interface that operatively couples the lever to an anti-lock braking system (ABS) of the vehicle, and based on the detected rotation of the lever, causing the ABS to lock at least one wheel of the vehicle.

An example tangible machine readable medium includes instructions, which when executed, cause a processor to at least determine a rotation of a hand-operated lever of a vehicle, wherein the lever is communicatively coupled to an anti-lock braking system (ABS) of a vehicle via a data interface, and based on the determined rotation of the lever, cause the ABS to lock at least one wheel of the vehicle.

An example method includes providing a hand-operated lever to a vehicle, and communicatively coupling the lever to a data interface associated with an anti-lock braking system (ABS).

BRIEF DESCRIPTION OF THE DRAWINGS

FIG. 1 is an example vehicle in which the examples disclosed herein may be implemented.

FIG. 2 is an enlarged view of an example brake assembly of the example vehicle of FIG. 1.

FIG. 4 is a schematic overview of an example integrated performance brake system in accordance with the teachings of this disclosure.

FIG. 5 is a detailed view of an example lever of the performance brake system of FIG. 4.

FIG. 7 is a table illustrating how the examples disclosed herein may control a mode of the integrated performance brake system of FIG. 4.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 3:
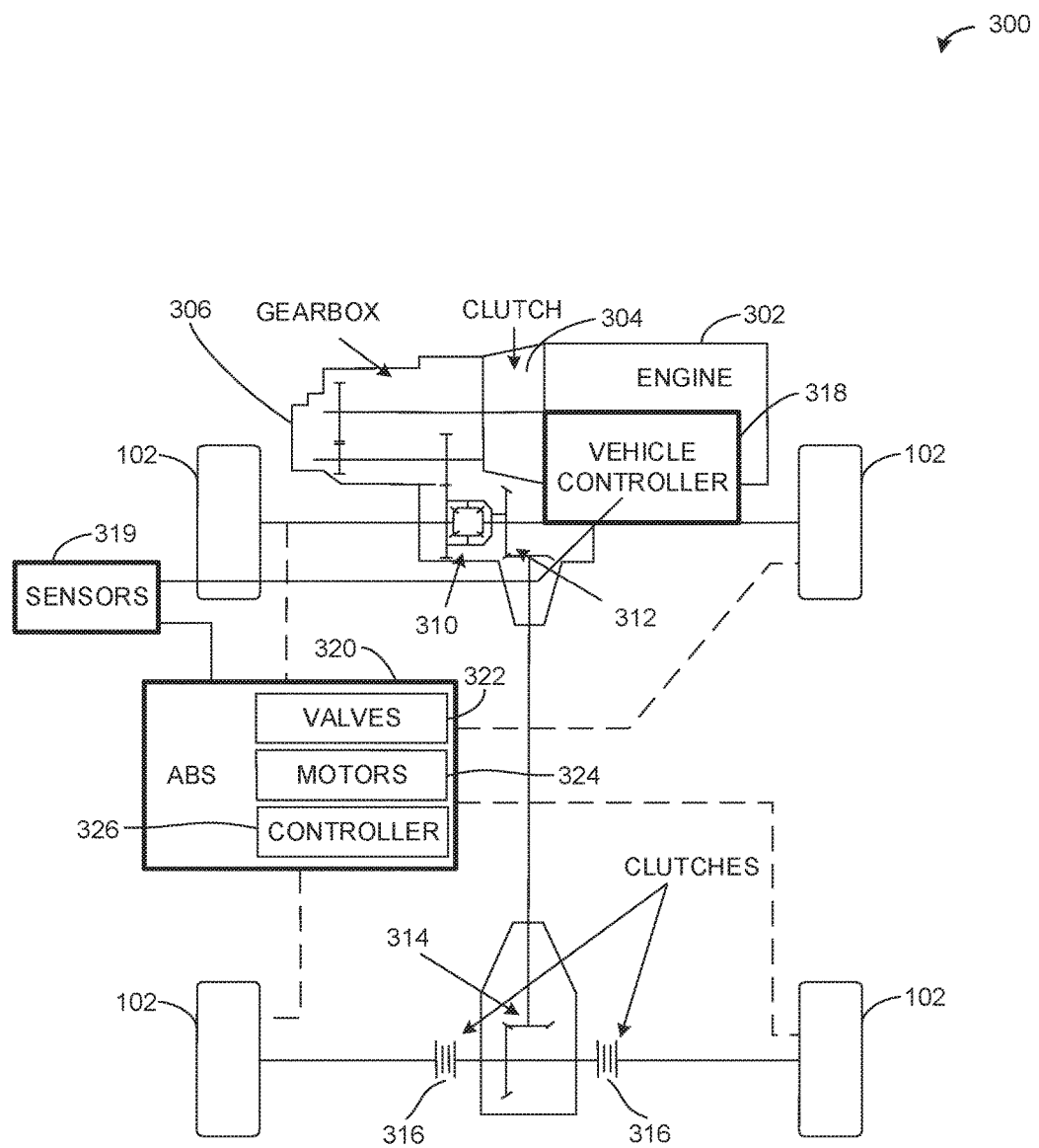
FIG. 3 is a schematic overview of an example drive system of the example vehicle of FIG. 1.

Integrated performance braking is disclosed herein. Performance driving, which may be associated with rally driving or track drifting, for example, usually requires a performance brake system that can require the addition of numerous components, which can be costly and/or involve significant labor based on complexity. In particular, hydraulic lines, cylinders and supporting equipment, all of which can involve significant expense and complexity, may need to be installed in a vehicle. Further, known performance brake systems are not integrated with control systems or other subsystems of a vehicle. In other words, these known braking systems operate independently of other modes and/or or functions associated with the vehicle.

The examples disclosed herein enable integration of performance brakes (e.g., maneuvering brakes, drifting brakes, rally brakes, etc.) into vehicles by digitally communicatively coupling a maneuvering input device, which may be implemented as a lever or a button, for example, to a brake system, such as an antilock braking system (ABS). As a result, highly responsive integrated performance brakes are enabled for performance maneuvering.

Some of the examples disclosed herein utilize a rotatable performance lever and a high-speed digital data interface to direct use of an ABS of a vehicle to significantly brake and/or lock at least one wheel of a vehicle during performance maneuvering. In some examples, the ABS is prevented from being controlled by the performance lever until numerous checks are successfully performed to prevent unintended operation of the performance lever.

In some examples, a clutch is disengaged when the ABS is controlled by the performance lever. In some examples, the ABS can only be controlled by the performance lever when the vehicle is in a selected mode (e.g., a track mode, a performance mode, a drift mode, a current selected mode, etc.).

As used herein, the terms "lock" or "locked" in the context of brakes, wheels and/or brake assemblies involves constraining at least one wheel of a vehicle such that rotation of the wheel is significantly reduced and/or the wheel does not rotate relative to the vehicle. As used herein, the terms "drifting" and "drift" refer to intentionally causing a vehicle to skid (e.g., skid sideways) during a driving maneuver (e.g., a closed track maneuver, a turning maneuver, etc.). As used herein, the term "performance brake" refers to a brake component, assembly and/or system that is used in racing or recreational maneuvering, such as drifting or rally racing, for example. Accordingly, as used herein, the term "performance lever" refers to a lever, stick or other similar input device used in conjunction with the aforementioned racing or recreational maneuvering. As used herein, the term "ABS" may refer to an ABS or any other braking control system, such as an electronic stability control (ESC) system, with ABS functionality.

FIG. 1 is an example vehicle 100 in which the examples disclosed herein may be implemented. According to the illustrated example of FIG. 1, the vehicle 100 includes a wheel assembly or wheel 102, which includes a brake assembly or brake 104, a rim 106 and a tire 108. In this example, the vehicle 100 includes multiple wheel assemblies 102. In operation, the brake assembly 104 is used to reduce a rate of rotation of the wheel 102 and, in turn, slow down (e.g., reduce a rotational speed) and/or maneuver the vehicle 100.

FIG. 2 is an enlarged view of the example brake assembly 104 of FIG. 1. The example brake assembly 104 includes a wheel attachment support (e.g., an axle) 202, a tone ring 204, brake pads (removed for clarity) and a brake caliper 208.

To prevent wheel slippage in known examples, an antilock braking system (ABS) 320 shown in FIG. 3 is implemented in the vehicle 100. In particular, wheel speed may be measured via the tone ring 204 to determine whether slippage is occurring at one or more of the tires 108 of the vehicle 100 and/or whether the vehicle 100 is skidding. As a result, the ABS 320 may control brakes (e.g., modulate one or more of the brakes) based on the slippage to prevent locking of the wheel 102. In contrast, and as will be discussed below in connection with FIGS. 4-11, the examples disclosed herein employ the ABS 320 (or other braking control system) in an opposite and counterintuitive manner from typical ABS functionality to enable locking and/or significant braking of the wheel 102 during a controlled driving maneuver that intentionally induces wheel slippage, such as drifting, for example. In other words, the examples disclosed herein can be directed to locking wheels, which is a counterintuitive use of an ABS, but advantageous for performance vehicle maneuvering.

FIG. 3 is a schematic overview of an example drive system 300 of the example vehicle 100 of FIG. 1. The examples disclosed herein may be implemented with the example drive system 300, which is an all-wheel drive system in this particular example. The drive system 300 of the illustrated example includes an engine 302, a clutch 304, a gearbox 306, a front differential 310 that is operatively coupled to the front wheels 102, a power transfer unit 312, a rear differential 314 that is operatively coupled to the rear wheels 102, and clutches (e.g., rear tire clutches, rear drive clutches) 316. According to the illustrated example, the drive system 300 is operatively coupled to and/or integrated with a vehicle controller 318, sensors 319 and the ABS 320 mentioned above in connection with FIG. 1, which includes valves 322, motors 324 and a controller 326.

In operation, the example drive system 300 is controlled by the vehicle controller 318, which directs a power transfer of the engine 302 to the gearbox 306 based on operation of the clutch 304. Accordingly, the front differential 310 directs power to the front wheels 102 while the power transfer unit 312 transfers power to the rear drive unit 314, thereby providing power to the rear wheels 102 when the clutches 316 are engaged. Conversely, disengaging the clutches 316 causes the rear wheels 102 to disengage from the overall drive system 300 by mechanically isolating the rear wheels 102.

According to the illustrated example, the ABS 320 communicates with the vehicle controller 318 and also directs braking of the brake assemblies 104 by causing intermittent or pulsating engagement of respective brake pads associated with the brake assemblies 104 to prevent further slippage of the wheels 102 when sensors associated with the ABS 320 and/or the vehicle controller 318 detect wheel slippage. As will be discussed below in connection with FIGS. 4-11, the example ABS 320 is also used to lock at least one of the wheels 102 during a driving maneuver when the vehicle 100 is operated in a performance-oriented driving mode.

FIG. 4 is a schematic overview of an example integrated performance brake system (e.g., a digital sliding brake system) 400 in accordance with the teachings of this disclosure. The performance brake system 400 of the illustrated example is communicatively coupled to the ABS 320 and includes an input device or hand-operated lever 402 (e.g., a performance lever, a drift lever, etc.) with a corresponding axis of rotation 403, positional sensors (e.g., micro-switches, angular rotation sensors, etc.) 404 and indicators 406, which are implemented as color-coded LEDs in this example. The example performance brake system 400 also includes a communication line 408, which is implemented as a cable/connector assembly in this example, that communicatively couples the lever 402 and/or the micro-switches 404 to a data plug or connector 410 and, thus, a data interface 412, which is implemented as a high-speed controller-area network (CAN) in this example. The connector 410 of the illustrated example is implemented as an onboard diagnostic (OBD) connector. In particular, the lever 402 and/or the micro-switches 404 include a transceiver to communicate with the data interface 412 using an OBD connection.

To verify and/or determine a status of the lever 402, the ABS 320 and/or the ABS controller 326 communicates with the lever 402 and/or the associated micro-switches 404, and receives an acknowledgement that the lever 402 and/or the micro-switches 404 are connected/coupled (e.g., in digital communication). Accordingly, the ABS 320 of the illustrated example determines that the lever 402 is assembled and/or attached for use. In particular, the lever 402 may be attached and/or assembled by a user/driver for specific driving use(s) (e.g., for recreational or performance/track driving).

To enable the lever 402 to actively control the ABS 320, the ABS 320 and/or the vehicle controller 318 perform numerous checks and/or verification of vehicle conditions and driver selected mode inputs to enable control of the lever 402. The checks and/or verification are described in greater detail below in connection with FIG. 7.

To control the ABS control system 320 in a performance mode (e.g., a track mode, a drifting mode) by the lever 402 during performance-oriented driving (e.g., drifting, track racing, rally racing, etc.), the micro-switches 404 are used to detect/measure an angle of rotation of the lever 402 about the axis of rotation 403 and provide or transmit a signal associated with the angle of rotation and/or angular position to the ABS 320 via the data interface 412. According to the illustrated example, a rotational angle of the lever 402 that moves past an angular/rotational position threshold (e.g., 15 degrees upward from horizontal/ground) causes the ABS system 320 to significantly cease rotation of (e.g., lock) at least one of the wheels 102 (e.g., the rear wheels 102) after the aforementioned checks and/or verification have been performed to enable the ABS 320 to be controlled by the lever 402 in the performance mode. In some examples, a degree to which the lever 402 is rotated is directly/proportionally related to how much the wheels 102 are prevented from rotating by the respective brakes 104. In some examples, the clutches 316 are disengaged during this performance mode (i.e., disengaging the rear wheels 102 from being provided with power/torque from the rear drive unit 314), thereby enabling power/torque to be provided to the front wheels 102 while the rear wheels 102 are generally ceased or locked from rotation. Additionally or alternatively, an electronic stability control (ESC) system of the vehicle 100 is disabled (e.g., manually disabled by a driver) in the performance mode.

According to the illustrated example, the indicators 406 are used to convey to the user/driver that the lever 402 is enabled to be operated in the aforementioned performance mode. In particular, the indicators 406 inform the driver that the lever 402 can now be used to control the ABS 320 in the performance mode. Additionally or alternatively, the indicators 406 show a status of the ABS 320 and/or a selected drive mode (e.g., a selected sport mode and/or drift mode) of the vehicle 100. In some examples, the indicators 406 also indicate that the electronic stability control (ESC) system of the vehicle 100 is disabled.

While the lever 402 is depicted in this example, any appropriate input device may be implemented including, but not limited to, a button, a trigger, a joystick, a tandem brake (e.g., an educational/training tandem brake), etc. While the example communication line 408 is implemented as a cable/connector assembly in this example, the communication line 408 may be wireless (e.g., Bluetooth or Wi-Fi protocol) and/or directly coupled to the ABS 320. While the connector 410 utilizes the OBD interface connection in this example, in other examples, the connector 410 and/or the communication line 408 may be implemented using a USB interface, SYNC® or any other appropriate protocol/interface.

FIG. 5 is a detailed view of the lever 402 of the example integrated performance brake system 400 of FIG. 4. According to the illustrated view of FIG. 5, the lever 402 is positioned proximate and to the right of a steering wheel 504 and to the left of a gear selector 506 (as viewed along a direction facing the front of the vehicle 100). Further, a distal end of the example lever 402 extends to a height proximate a center of the steering wheel 504 when the lever 502 is at a substantially vertical or neutral angular position.

The example placement of the lever 402 shown in FIG. 5 is only an example placement and the lever 402 may be placed in any appropriate position within. Similarly, the distal end of the lever 402 may be positioned at any appropriate relative height to a driver and/or the steering wheel 504.

Figure 6:
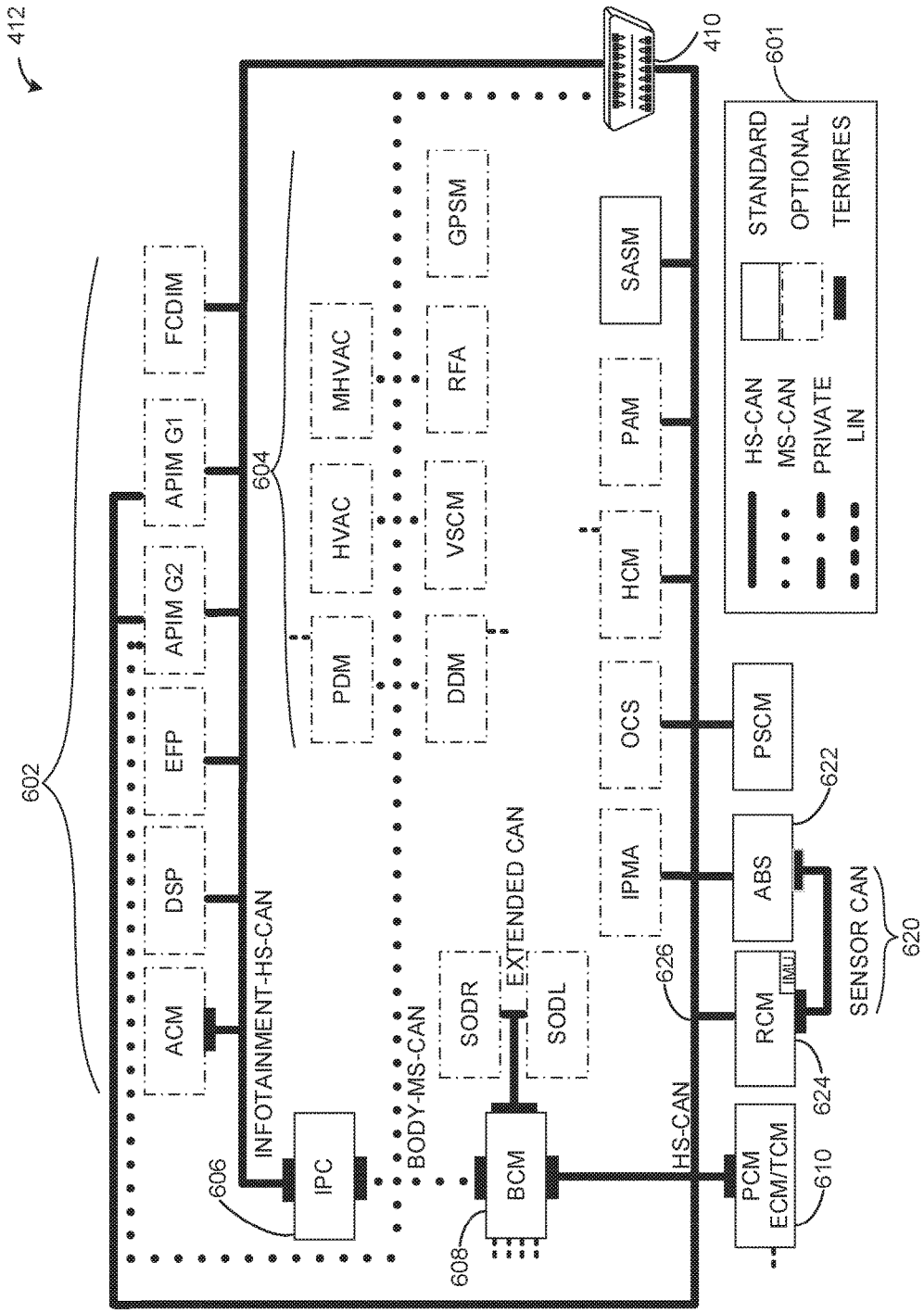
FIG. 6 is a schematic overview of an example topology of a data interface of the example integrated performance brake system of FIG. 4.

FIG. 6 is a schematic overview illustrating an example topology of the data interface 412 of FIG. 4. According to the illustrated example, a legend 601 depicts data speed buses. In this example, the data interface 412 is implemented as a controller area network (CAN). The topology of FIG. 6 that is associated with the example data interface 412 is an example of how data communications may be routed therebetween to enable control of the ABS 320 via rotational movement or displacement of the lever 402.

According to the illustrated example, the data interface 412, which is implemented as a high-speed CAN in this example, includes infotainment nodes 602. The infotainment nodes 602 include an audio front control module (ACM), an accelerator (EFP) module, accessory protocol interface modules (APIM G1 and G2) and a Front Control/Display Interface Module (FCDIM). The example data interface 412 also includes body nodes 604, which are implemented as a medium-speed CAN including heating ventilation air conditioning (HVAC, mHVAC) device modules, a passenger door module (PDM), a vehicle security control module (VSCM), a driver door module (DDM) and a global position system module (GPSM). The example data interface 412 also includes an instrument panel cluster (IPC) node 606, a body control module (BCM) node 608 and a powertrain/engine/transmission control module (PCM/ECM/TCM) node 610. The data interface 412 of the illustrated example also includes a sensor CAN 620 with an ABS node 622 and a restraint control module (RCM) node 624. In this example, a high speed data line 626 communicatively couples the connector 410 and the ABS node 622.

In operation, rotational movement and/or connection status of the lever 402 is transmitted to the ABS node 622, which is communicatively coupled to and/or integrated with the ABS 320, via the high speed data line 626. As a result, a relatively quick response (e.g., a near instantaneous response) of the ABS 320 based on movement of the lever 420 is enabled. Further, the example ABS 320 is also able to verify a status of the vehicle 100 to enable operation and/or control of the ABS 320 by the lever 420. In particular, the ABS 320 and/or the vehicle controller 318 verify inputs received at or from either the BCM node 608 or the IPC node 604 to determine that performance mode has been enabled and, thus, enable control of the ABS 320 by the lever 420, for example.

While the topology shown in FIG. 6 is a CAN implementation, any appropriate network or communication topology may be implemented. Further, any appropriate communication protocol, such as a wireless communication protocol, may be alternatively implemented.

FIG. 7 is a table 700 illustrating how the examples disclosed herein may control a mode of the integrated performance brake system 400 based on multiple system checks. In particular, the table 700 depicts system checks that may enable the ABS 320 to be controlled by the lever 402. The checks of the example table 700 may be verified by the ABS controller 326, for example, to grant control to the example lever 420. According to the illustrated example, the table 700 includes columns 702, which indicate different checks and/or verifications while rows 706 indicate different combinations/permutations of scenarios. As can be seen in the illustrated example, control of the lever 402 is enabled when an electronic stability control (ESC) system is manually turned off, a presence of the lever 402 is indicated, an angular rotation counter/check sum of the lever 402 is verified, the ABS 320 is returning a ready message, a vehicle speed ranges within a certain range (e.g., between 3 and 70 miles per an hour (mph)), and a service brake is detected not to be in use. In this example, implementation of the data interface 412 allows these checks to be effectively performed without a significant amount of hardware or software additions. Accordingly, a row 708 indicates a set of conditions/checks in which the lever 402 is active and enabled to control the ABS 320.

The example table 700 of FIG. 7 only indicates example checks and any other appropriate checks or combinations of checks may be used based on application/needs to enable control of the ABS 320 by the lever 420.

Figure 8:
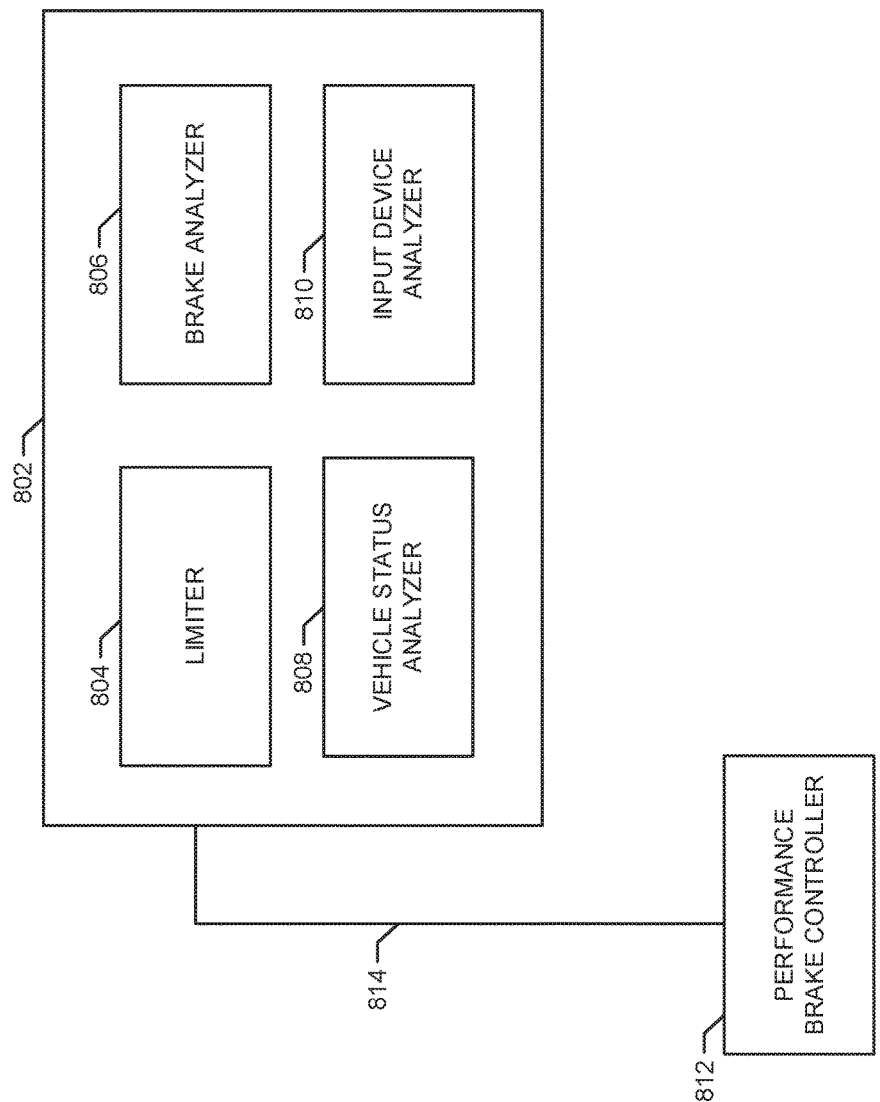
FIG. 8 illustrates an example performance brake control system that may be used to implement the examples disclosed herein.

FIG. 8 illustrates an example performance brake control system 800 that may be used to implement the examples disclosed herein. The performance brake control system 800 may be implemented in the vehicle controller 318 and/or the ABS controller 326, or any appropriate node or module of the example data interface 412. The brake control system 800 of the illustrated example includes a brake computer 802, which includes a limiter 804, a brake analyzer 806, a vehicle status analyzer 808, and an input device analyzer 810. In this example, the brake control system 800 also includes a performance brake controller 812 that is communicatively coupled to the brake computer 802 by a communication line 814.

To verify that the vehicle 100 can be placed into a performance mode and/or a track drift mode, the limiter 804 of the illustrated example performs multiple checks, such as whether an electronic stability control system of the vehicle 100 is turned off, whether the lever 402 is connected/coupled, and in what mode(s) the vehicle 100 is currently set (e.g., a performance drift mode, a selected drift mode, etc.). Accordingly, checks similar to those described above in connection with FIG. 7 may be performed by the limiter 804.

According to the illustrated example, the vehicle status analyzer 808 receives sensor data from the sensors 319 shown in FIG. 3 to calculate a current condition of the vehicle 100. This condition can include measured vehicle speed, external conditions, weather, selected settings (e.g., selected vehicle mode settings), etc. Additionally or alternatively, the vehicle status analyzer 808 determines a degree of slippage of the wheels 102 and/or whether the vehicle 100 is currently performing a maneuver (e.g., a drift maneuver).

To determine a degree of braking power to be provided to the wheels 102 by the ABS 320 based on a rotation of the lever 402, the brake analyzer 806 calculates a proportional amount of braking power to be provided to at least one of the wheels 102 by the ABS 320. Additionally or alternatively, the brake analyzer 806 determines whether to lock at least one of the wheels 102 (e.g., the rear wheels 102) for a driving maneuver.

According to the illustrated example, the input device analyzer 810 determines or verifies a presence of the lever 402 and a degree to which the lever 402 is rotated. In some examples, the input device analyzer 810 verifies proper (e.g., accurate) operation of the lever 402 and/or the respective micro-switches 404. Additionally or alternatively, the input device analyzer 810 authenticates the lever 402 to ensure that the lever 402 is not intended for another model or produced by an unauthorized manufacturer.

The example performance brake controller 812 controls the ABS 320 when the driver provides input to the lever 402 after the limiter 804 has performed the necessary checks mentioned above. In this example, the performance brake controller 812 also disengages the clutches 316 to isolate the rear wheels 102 from being provided with torque by the rear differential unit 314 during a driving maneuver. In some examples, the performance brake controller 812 determines which of the wheels 102 to lock.

While an example manner of implementing the performance brake control system 800 of FIG. 8 is illustrated in FIG. 8, one or more of the elements, processes and/or devices illustrated in FIG. 8 may be combined, divided, re-arranged, omitted, eliminated and/or implemented in any other way. Further, the example limiter 804, the example brake analyzer 806, the example vehicle status analyzer 808, the example input device analyzer 810, the example performance brake controller 812 and/or, more generally, the example performance brake control system 800 of FIG. 8 may be implemented by hardware, software, firmware and/or any combination of hardware, software and/or firmware. Thus, for example, any of the example limiter 804, the example brake analyzer 806, the example vehicle status analyzer 808, the example input device analyzer 810, the example performance brake controller 812 and/or, more generally, the example performance brake control system 800 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, limiter 804, the example brake analyzer 806, the example vehicle status analyzer 808, the example input device analyzer 810, and/the example performance brake controller 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example performance brake control system 800 of FIG. 8 may include one or more elements, processes and/or devices in addition to, or instead of, those illustrated in FIG. 8, and/or may include more than one of any or all of the illustrated elements, processes and devices.

Figure 9:
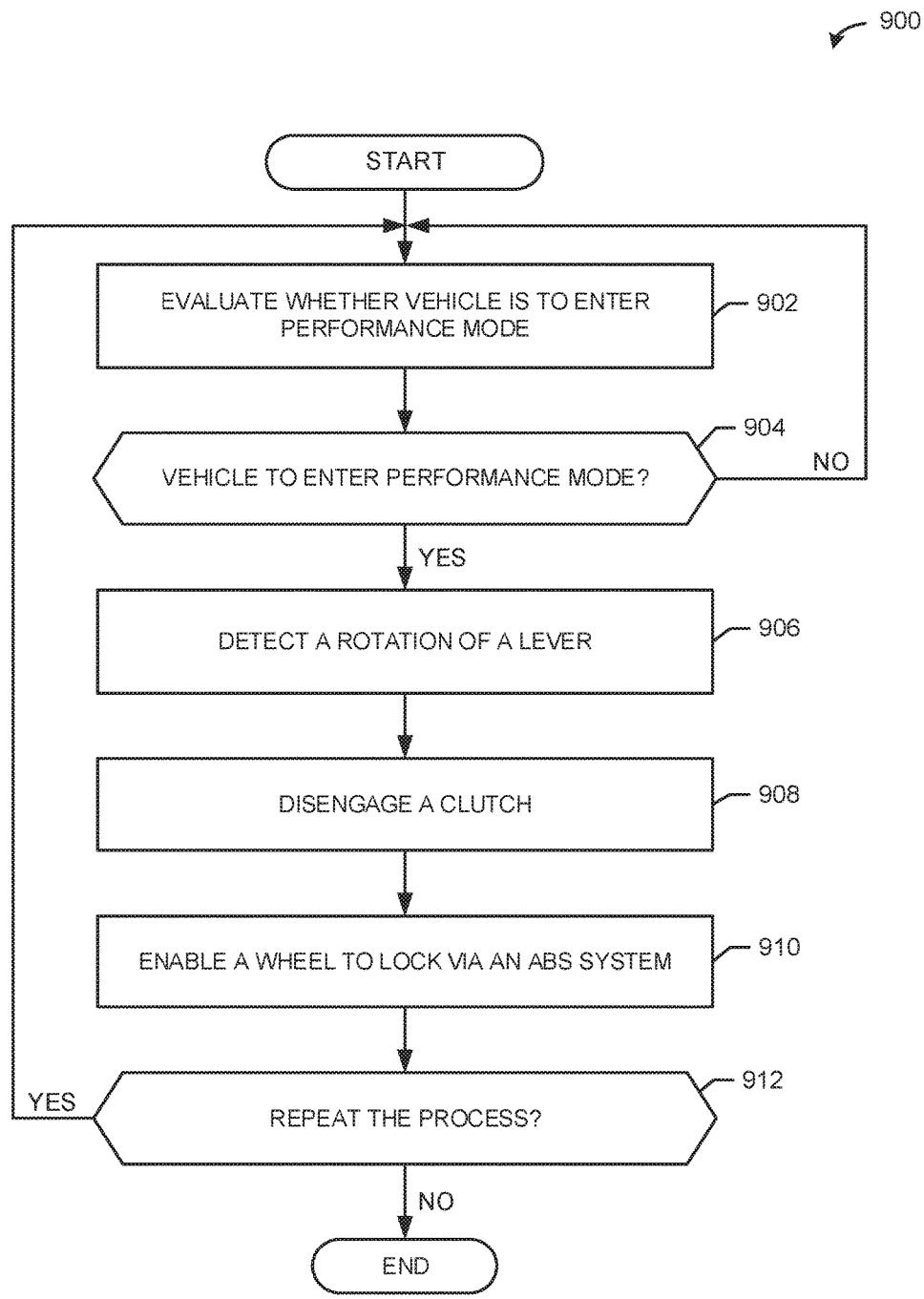
FIG. 9 is a flowchart representative of an example method that may be used to implement the performance brake control system of FIG. 8.
Figure 10:
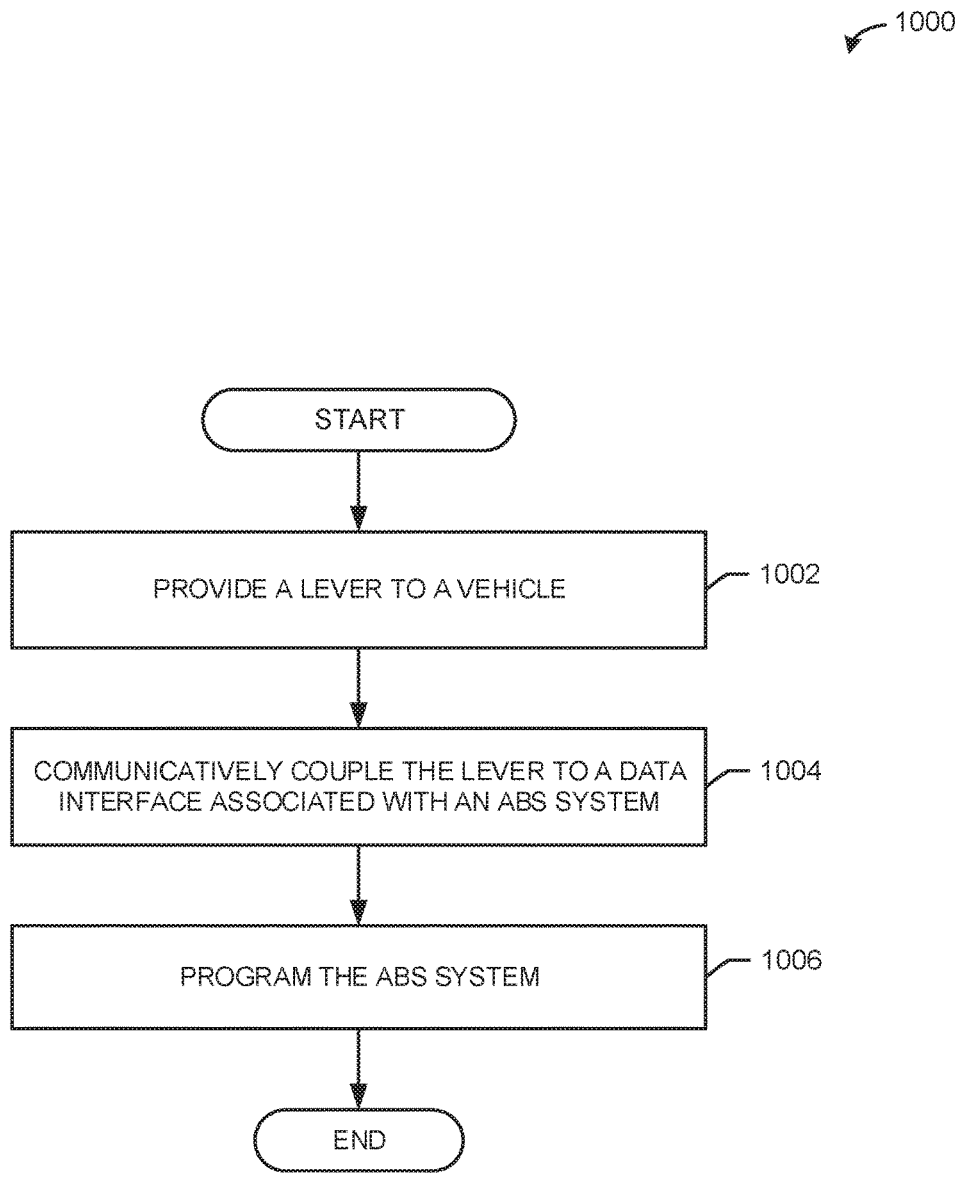
FIG. 10 is a flowchart representative of an example method that may be used to produce the examples disclosed herein.

Flowcharts representative of example machine readable instructions for implementing the performance brake control system 800 of FIG. 8 are shown in FIGS. 9 and 10. In this example, the machine readable instructions comprise a program for execution by a processor such as the processor 1112 shown in the example processor platform 1100 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9 and 10, many other methods of implementing the example performance brake control system 800 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example method 900 of FIG. 9 begins as the vehicle 100 is being driven. In this example, the vehicle 100 is being driven on a closed-course track and has not yet entered a performance mode (e.g., a drifting mode).

According to the illustrated example, the vehicle status analyzer 808 determines whether the vehicle is to enter the performance mode (block 902). In this example, the determination occurs based on data (e.g., sensor data) and selected mode settings similar to that described above in connection with FIG. 7. In some other examples, the vehicle status analyzer 808 utilizes a GPS position of the vehicle 100 to determine that the vehicle 100 is located on a track and, thus, can enter the performance mode.

If the vehicle is to enter the performance mode (block 904), control of the process proceeds to block 906. Otherwise, control of the process returns to block 902.

According to the illustrated example, the micro-switches 404 and/or the input device analyzer 810 detect a rotation and/or a rotational position (e.g., an angular rotation) of the lever 402 (block 906). In some examples, an optical sensor is used to detect the rotational position of the lever 402. In other examples, another mechanical input device, such as a button on a steering wheel, is used instead.

In some examples, one or more of the clutches 316 may be disengaged by the performance brake controller 812 (block 908). In particular, two of the clutches 316 disengage the rear wheels 102 from a powertrain of the drive system 300 while the front wheels 102 are still being driven with torque.

Next, the example performance brake controller 812 causes the ABS 320 to lock at least one of the wheels 102 (block 910). In this example, the performance brake controller 812 causes the ABS 320 to lock the rear wheels 102. Additionally or alternatively, the performance brake controller 812 proportionally varies a degree to which the ABS 320 provides braking power to the wheels 102 (e.g., the rear wheels 102) based on an angle of rotation of the lever 402.

Next, it is determined whether to repeat the process (block 912). If the process is to be repeated (block 912), control of the process returns to block 902. Otherwise, the process ends.

The example method 1000 of FIG. 10 begins as the performance braking system 400 is to be implemented in the vehicle 100. In particular, the example method 1000 may be pertinent to manufacturing or retrofitting a performance input device, such as the example performance lever 402, onto a vehicle (i.e., post production implementation or modifications). In particular, the lever 402 and associated components (e.g., cabling, flash programming, sensors, etc.) may be added to a car in post-production, at dealerships or during consumer-oriented upgrades/modifications.

According to the illustrated example, the lever 402 and/or an assembly associated with the lever 402 is provided to the vehicle 100 (block 1002). In this example, the lever 402, the micro-switches 404 and the indicators 406 are assembled/coupled to an interior of the vehicle 100 as an integrated assembly. In this example, this integrated assembly is communicatively coupled to the data interface 412 and, in turn, the ABS 320 via an OBD connector interface.

Next, the lever 402 is communicatively coupled to the data interface 412 associated with the ABS 320 (block 1004).

In some examples, the ABS 320 and/or the ABS controller 326 are programmed to receive input from the lever 402 (block 1006). Additionally or alternatively, the ABS 320 and/or the ABS controller 326 are programmed to communicate with other vehicle subsystems to determine whether to enable control of the ABS 320 by the lever 402. In some examples, the programming involves setting check parameters, as described above in connection with FIG. 7.

Figure 11:
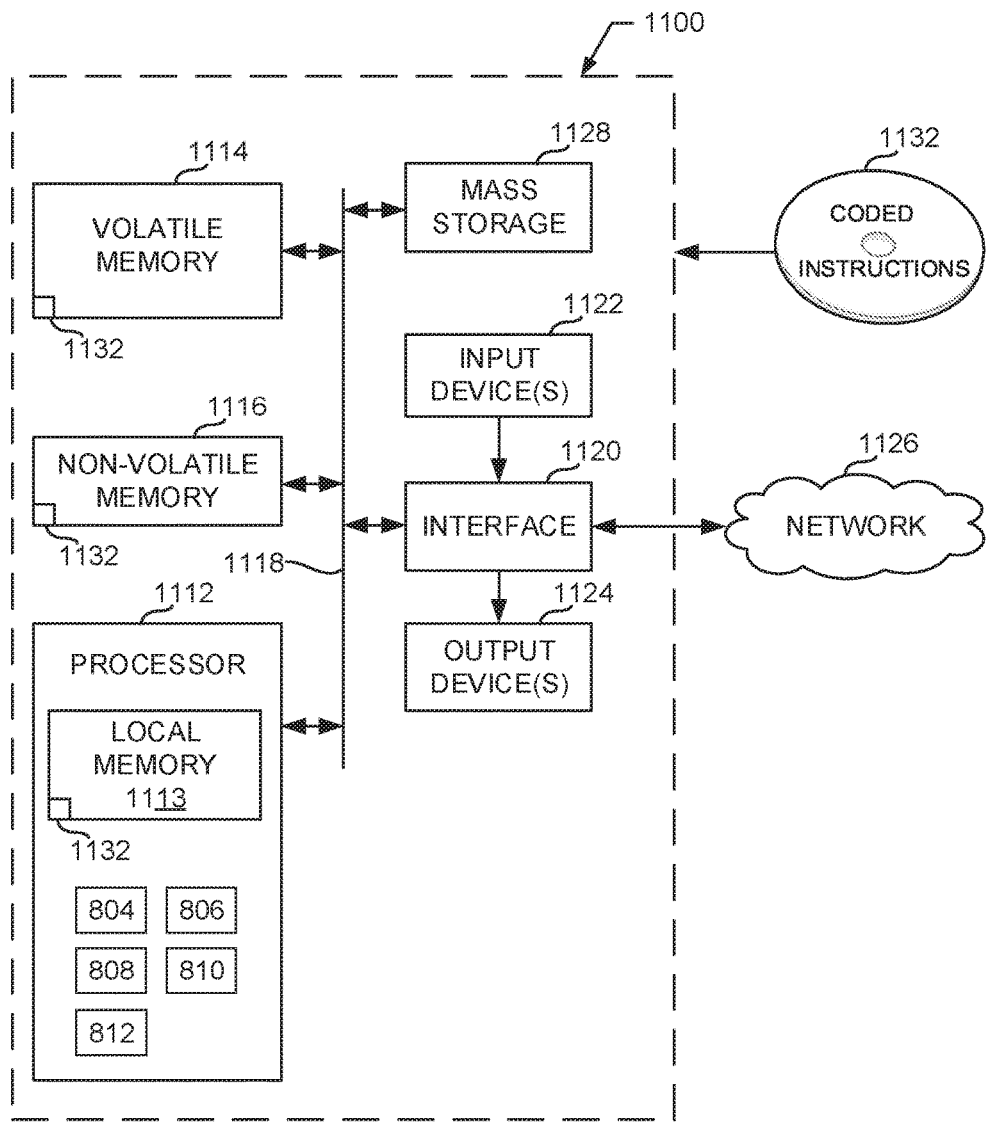
FIG. 11 is a block diagram of an example processor platform capable of executing machine readable instructions to implement the example methods of FIGS. 9 and 10 and/or the integrated performance brake system of FIG. 4.

FIG. 11 is a block diagram of an example processor platform 1000 capable of executing the instructions of FIGS. 9 and 10 to implement the performance brake control system 800 of FIG. 8. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example limiter 804, the example brake analyzer 806, the example vehicle status analyzer 808 and the example input device analyzer 810.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 to implement the methods of FIGS. 9 and 10 may be stored in the mass storage device 1128, in the volatile memory 1114, in the non-volatile memory 1116, and/or on a removable tangible computer readable storage medium such as a CD or DVD.

From the foregoing, it will be appreciated that example methods, apparatus and articles of manufacture have been disclosed that provide a digitally operated performance brake, which can be highly responsive and cost-effective to implement. Further, the examples disclosed herein enable numerous checks to occur so that performance braking is enabled only when numerous conditions are met, thereby preventing any unintended use of a performance oriented brake.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to track/racing performance braking and/or maneuvering, the examples disclosed herein may be applied to any other appropriate application including tandem braking (e.g., for educational purposes) and/or engine control operations, for example.

What is claimed is:

1. An apparatus comprising:
    a hand-operated lever of a vehicle;
    a data interface to operatively couple the lever to an anti-lock braking system (ABS) of the vehicle;
    a brake controller to cause at least one wheel of the vehicle to lock via the ABS when the lever is rotated to a defined angular position; and
    a limiter to prevent the ABS from locking the at least one wheel based on vehicle conditions or settings.

2. The apparatus as defined in claim 1, wherein the limiter enables locking of the at least one wheel when the vehicle is in a selected drift mode.

3. The apparatus as defined in claim 1, further including micro-switches to measure an angular position of the lever.

4. The apparatus as defined in claim 1, further including an indicator to indicate a status of the lever and the ABS.

5. The apparatus as defined in claim 1, wherein the data interface includes a controller area network (CAN) interface.

6. The apparatus as defined in claim 1, wherein the brake controller is integral with the ABS.

7. A method comprising:
    detecting, via a sensor, a rotation of a hand-operated lever of a vehicle;
    transmitting a signal associated with the detected rotation of the lever to a data interface that operatively couples the lever to an anti-lock braking system (ABS) of the vehicle;
    determining a condition or a setting of the vehicle; and
    based on the detected rotation of the lever and the condition or the setting, causing the ABS to lock or preventing the ABS from locking at least one wheel of the vehicle.

8. The method as defined in claim 7, wherein determining the condition or the setting is based on a selected mode of the vehicle.

9. The method as defined in claim 8, wherein the selected mode includes a drift mode of the vehicle.

10. The method as defined in claim 7, further including disengaging a clutch associated with the at least one wheel of the vehicle when the ABS is to lock the at least one wheel.

11. The method as defined in claim 10, wherein disengaging the clutch includes disengaging rear wheels of the vehicle.

12. The method as defined in claim 7, further including verifying that the lever is coupled to the vehicle.

13. The method as defined in claim 12, further including verifying operation of the lever.

14. A tangible machine readable medium comprising instructions, which when executed, cause a processor to at least:
    determine a rotation of a hand-operated lever of a vehicle, wherein the lever is communicatively coupled to an anti-lock braking system (ABS) via a data interface;
    determine a vehicle condition or a setting; and
    based on the determined rotation of the lever and the vehicle condition or the setting, cause the ABS to lock at least one wheel of the vehicle or prevent the ABS from locking the at least one wheel of the vehicle.

15. The tangible machine readable medium as defined in claim 14, wherein the instructions cause the processor to disengage a clutch when the ABS locks the at least one wheel of the vehicle.

16. The tangible machine readable medium as defined in claim 14, wherein the instructions cause the processor to verify that the lever is coupled to the vehicle.

17. The tangible machine readable medium as defined in claim 14, wherein the determination of the vehicle condition or the setting includes determining a selection of a drift mode of the vehicle.

* * * * *